J. W. MELVILLE.
HAY FORK.
APPLICATION FILED MAY 24, 1910.

993,267.

Patented May 23, 1911.

WITNESSES:
Geo. Bambay.
P. A. Hoster

INVENTOR
James W. Melville
BY Munn Co.
ATTORNEYS

UNITED STATES PATENT OFFICE.

JAMES W. MELVILLE, OF CHIPPEWA FALLS, WISCONSIN.

HAY-FORK.

993,267.  Specification of Letters Patent.  Patented May 23, 1911.

Application filed May 24, 1910. Serial No. 563,070.

*To all whom it may concern:*

Be it known that I, JAMES W. MELVILLE, a citizen of the United States, and a resident of Chippewa Falls, in the county of Chippewa and State of Wisconsin, have invented a new and Improved Hay-Fork, of which the following is a full, clear, and exact description.

The invention relates to hay holders, and has for an object to provide a hay fork for conveniently and automatically handling hay, to reduce the amount of labor required in spreading the hay on the hay mow or the like. For the purpose mentioned, use is made of a main stem, a trip rod mounted to slide in the main stem, and tines mounted to successively operate on the main stem when engaged by the trip rod.

Reference is to be had to the accompanying drawings constituting a part of this specification, in which similar characters of reference indicate corresponding parts in all views, and in which—

Figure 3:
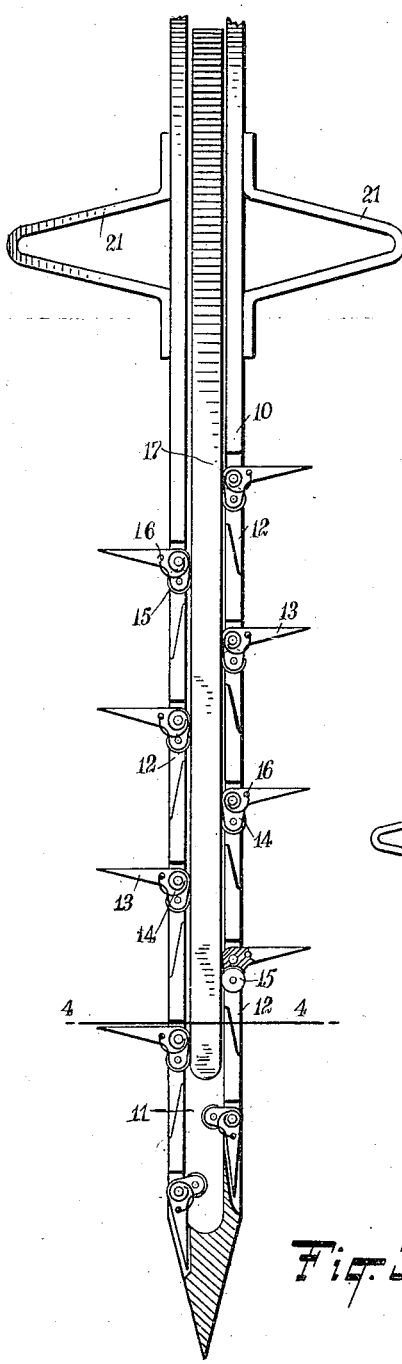
Figure 1:
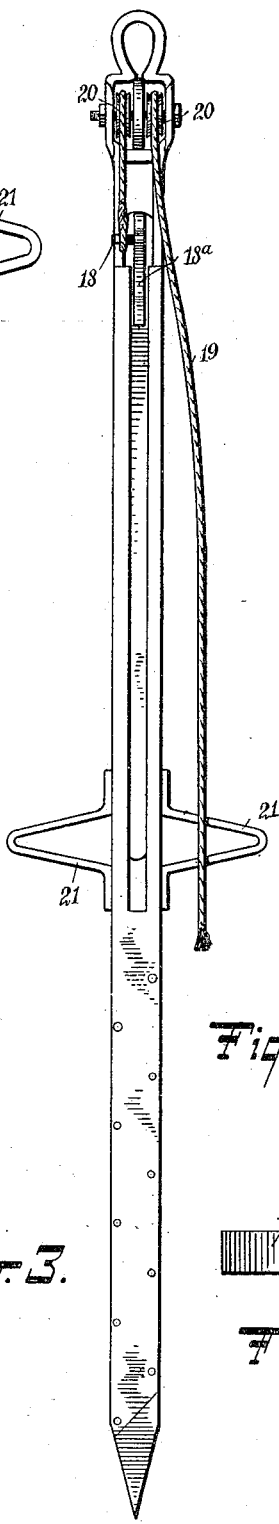
Figure 2:
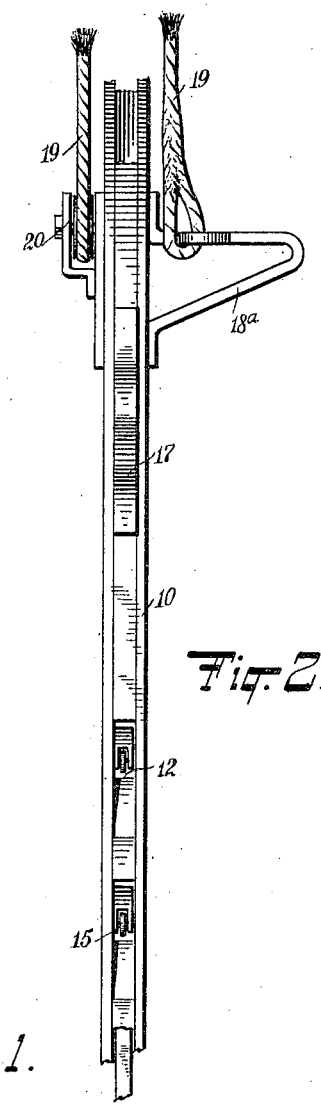
Figure 4:
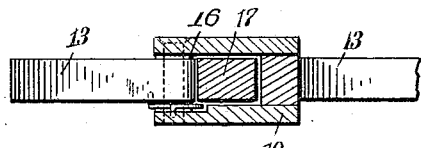

Figure 1 is a front elevation of my device with the tines in inoperative position; Fig. 2 is a partial view of the invention with a portion of the main stem removed to disclose the underlying structure, parts being in section and the tines in inoperative position; Fig. 3 is a side elevation of a part of my hay fork, and Fig. 4 is a sectional view, taken on the line 4—4 in Fig. 3.

Referring more particularly to the views, I provide a pointed main stem 10, having a longitudinal space 11 therein and apertures 12 alternately located in the sides of the main stem. Pivotally mounted on the main stem, in the said apertures 12, are a series of tines 13, having integral arms 14 eccentric to the tines 13 and constituting roller bearings 15. Springs 16, preferably coiled, are provided to engage the tines 13 and the main stem 10, to control the movement of the tines 13. A trip rod 17 is mounted to slide in the main stem 10 and in order to suitably guide the trip rod, the main stem 10 is partially slotted at the upper end. An eye 18 is secured to a handle 18ᵃ on the upper end of the trip rod 17, and a rope 19 is secured thereto, the said rope being adapted to conveniently pass over several pulleys 20, to facilitate the operation of the trip rod. Handles 21 are provided on the main stem 10 as will be conveniently seen in Fig. 3.

The operation of the device is as follows: When it is desired to secure a batch of hay the trip rod 17 is permitted to move toward the pointed end of the main stem 10, and in doing so the trip rod engages the various roller bearings 15 and moves the tines outwardly at right angles to the main stem 10. When the trip rod is withdrawn from the space or chamber 11, the action of the springs 16 successively returns the tines to their normal or inoperative position in the main stem. In the use of several tines adapted to operate successively, the hay when released from the tines does not fall onto the mow in one mass but is divided, by reason of the fact that as each tine returns to inoperative position, a bundle or batch of hay is released. Thus the hay can be easily manipulated after being detached from the hay fork.

Although for the purpose of describing my device, I have shown a particular construction, it will be easily understood that I do not limit myself thereto, the scope of my invention being fully defined in the appended claim.

Having thus described my invention, I claim as new and desire to secure by Letters Patent:

A hay fork comprising a hollow, longitudinally slotted main stem, a trip rod mounted to slide in the stem and a plurality of tines longitudinally disposed in rows on the main stem and mounted to swing thereon, with the tines in one row relatively staggered with respect to the tines in the other row, the said tines being in the form of two-armed levers with one arm of each of the tines provided with a roller arranged to be engaged by the trip rod to move the other arm of each tine at right angles to the main stem.

In testimony whereof I have signed my name to this specification in the presence of two subscribing witnesses.

JAMES W. MELVILLE.

Witnesses:
RICHARD F. CONNELL,
ERNEST ROYCRAFT.

---

Copies of this patent may be obtained for five cents each, by addressing the "Commissioner of Patents, Washington. D. C."